Jan. 23, 1962 P. GREGER ET AL 3,017,813
PHOTOGRAPHIC CAMERA HAVING AN ELECTRIC EXPOSURE METER
Filed June 14, 1960 2 Sheets-Sheet 1

INVENTORS
PAUL GREGER, GOTTHARD KINDER
and RICHARD SOMMER
BY
Blum, Moscovitz, Friedman & Blum
ATTORNEYS

United States Patent Office 3,017,813
Patented Jan. 23, 1962

3,017,813
PHOTOGRAPHIC CAMERA HAVING AN
ELECTRIC EXPOSURE METER
Paul Greger, Gotthard Kinder, and Richard Sommer, Braunschweig, Germany, assignors to Voigtländer A.G., Braunschweig, Germany, a corporation of Germany
Filed June 14, 1960, Ser. No. 35,931
Claims priority, application Germany Dec. 3, 1959
3 Claims. (Cl. 95—10)

This invention relates to photographic cameras of the type provided with an electric exposure meter having a light sensitive cell in front of which there is arranged a light stop or shield, and more particularly to such cameras in which the light stop or shield comprises a pair of axially adjacent coaxial annular screens rotatable independent of each other, one screen being provided with light controlling zones extending concentrically thereof, and the other screen being provided with light controlling zones extending radially thereof.

In a camera of this type known only from a printed publication (German Patent 730,288), the annular light shields are mounted on the objective mount body and are arranged in front of a single light sensitive cell mounted on the front of such body. The screens are coupled, in a manner not explained in detail in the publication, with the setting means for variable exposure conditions, such as the setting means for the diaphragm opening or for the exposure time. When the diaphragm opening and exposure time have been adjusted correctly in accordance with the light conditions available at any given time, the pointer of the measuring instrument or indicator connected with the light sensitive cell will occupy a pre-set position. As a consequence, this arrangement cannot be used with cameras in which one variable exposure condition, such as exposure time or diaphragm opening, is intended to be freely preselectable, while another exposure condition is adjusted in conformity with the indication of the light measuring instrument, and which latter adjustment is made either by adjusting the setting means until a marker or indicator connected therewith coincides with the position of the indicator of the measuring instrument, or in which the setting means is coupled with a device which mechanically scans the position of the indicator of the measuring instrument. Additionally, in the camera of this type as described in the printed publication, it is not possible to introduce into the indication of the measuring instrument a fixedly predetermined exposure condition, such as the film sensitivity value, without additional and relatively complicated apparatus components.

Furthermore, the device described in the publication cannot be applied, without additional relatively complicated mechanisms, to cameras of the aforementioned type in which one of the exposure condition setting means is adjusted with reference to a linear scale in which each scale value, in a given direction along the scale, is twice the value of the preceding scale value. In arrangements of this type, the adjustment of a light controlling screen must take place in such a manner that, from one indication of a linear scale to the next, the intensity of the light impinging upon the light sensitive cell is either halved or doubled. While the screen itself can be adjusted to meet this requirement without additional mechanism, in such case its path of adjustment, which is dependent on the position in space of the light sensitive cell, deviates considerably from the path of adjustment of the exposure condition setting means, such as the exposure time adjusting ring or the diaphragm opening adjusting ring, and which latter path of adjustment is determined by constructional considerations. Thus, a direct coupling between a light controlling screen of the aforementioned type and an exposure condition adjusting means to meet the above conditions as to adjustment of exposure time or diaphragm opening is not possible, and it would be essential to include between the screen and the adjustor a mechanism compensating for the different adjustment paths.

It is an object of the present invention to use the aforementioned light controlling arrangement in a camera in which one of the variable exposure conditions, such as the exposure time or diaphragm opening, is freely adjustable, and in which the indication of the measuring instrument connected to the light sensitive cell has introduced thereinto a fixed exposure condition, such as the film sensitivity value, and is utilized in adjusting the other variable exposure condition, such as the diaphragm opening or the exposure time.

In accordance with the present invention, in a camera of the above mentioned type one annular screen of the light controlling means is coupled in a known manner with the setting means for one of the variable exposure conditions, such as exposure time or diaphragm opening, and the other annular screen of the light controlling means is coupled with the setting means for a fixed exposure factor, such as the film sensitivity value. More particularly, in accordance with the present invention it has been found that the coupling between one of the annular light controlling screens and the setting means for one variable exposure condition, such as the exposure time, which is adjusted in accordance with a linear scale, can be effected by a direct coupling if the light sensitive cell is divided into several, preferably three, partial cells or sections which are uniformly angularly arranged about the axis of the objective as a center. In this arrangement, each of the screens carries a number of light controlling zones corresponding to the number of such cell sections. Thereby, the range of movement of the light controlling screens necessary to completely cover or to completely uncover the cell sections is restricted to a value corresponding to the conventional adjusting range of the exposure time setting means or of the diaphragm opening setting means.

The exact adjustment of the ranges of rotation of the screen to the existing fixed range of rotation of the ring for adjusting the exposure time or for adjusting the diaphragm, and which is to be coupled to the screen, is effected by correspondingly forming the light controlling zones of variable area in such manner that, upon displacement of the setting means from one scale value to the next scale value, the amount of light incident upon the partial cells is either halved or doubled. The variable area light controlling zones can be arranged to vary uniformly in area or can be arranged to vary in area step by step.

For an understanding of the principles of the invention, reference is made to the following description of a typical embodiment thereof as illustrated in the accompanying drawings. In the drawings.

Figure 1:
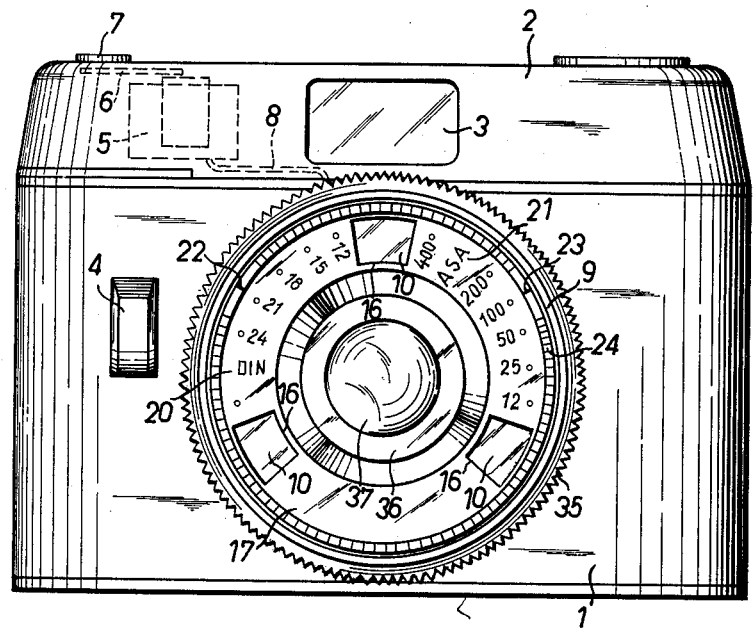
FIG. 1 is a front elevational view of a photographic camera embodying the invention.

Referring to FIG. 1, a photographic camera embodying the invention is illustrated as comprising a main body or housing 1, a cap 2, a viewfinder 3, and a shutter release key 4. Cap 2 overlies a measuring or indicating instrument 5 having a pointer 6 visible through a window 7. The indicating instrument 5 is connected by a cable 8 with three light sensitive cells or cell sections 10 arranged on the forward end of the objective mount 9.

Figure 2:
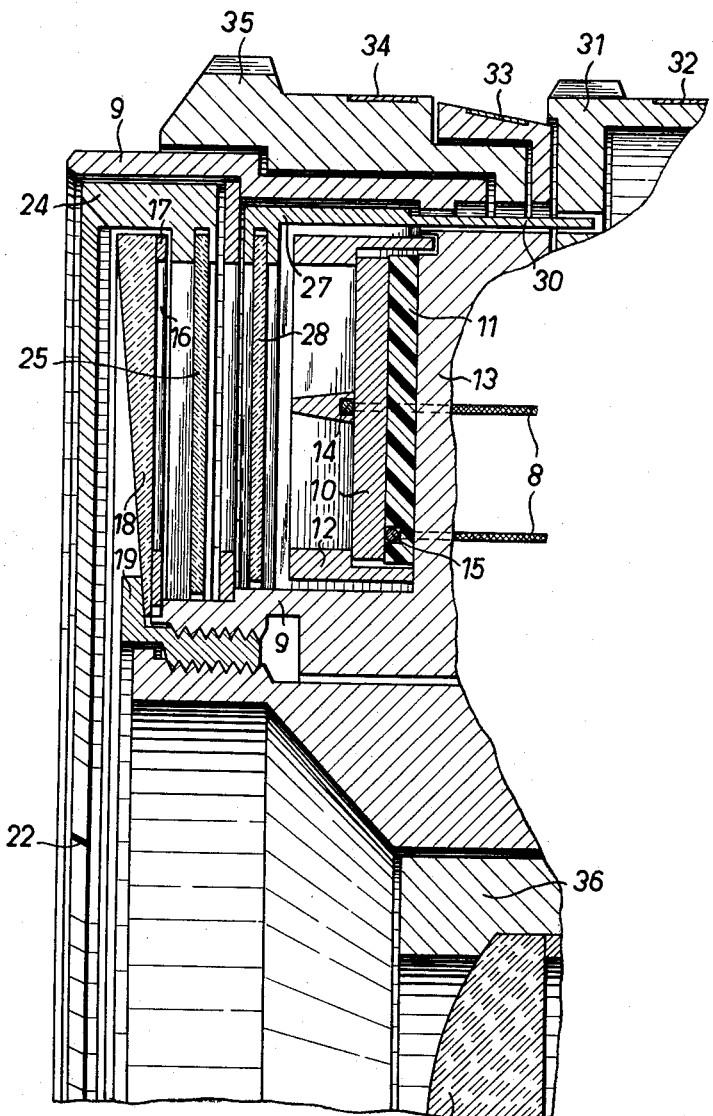
FIG. 2 is a partial axial section view of the objective mount of the camera on a greatly enlarged scale.

FIG. 2 shows the arrangement of one of these cell sections 10 in the objective mount 9, and the other two cell sections are arranged in a similar manner. Cell 10 is disposed between a dielectric plate 11 and a frame 12 mounted on a wall 13 of the objective mount 9. Contact elements 14 and 15 electrically connect cell 10 with the cables 8 connected to the measuring instrument 5. The light incident upon cell 10 passes through a window 16 located in a scale ring 17 and closed, toward the front of the camera, by an annular transparent disk 18.

Scale ring 17 and disk 18 are fixedly secured in the objective mount 9 by means of a threaded ring 19. As best seen in FIG. 1, scale ring 17 carries film scales 20 and 21 calibrated, respectively, in "DIN" and "ASA" values. Adjusting marks 22 and 23, respectively cooperable with scales 20 and 21, are arranged on the knurled front surface of an exposure condition setting ring 24 rotatably mounted in the objective mount 9 and having secured therein an annular transparent material screen 25.

Figure 3:
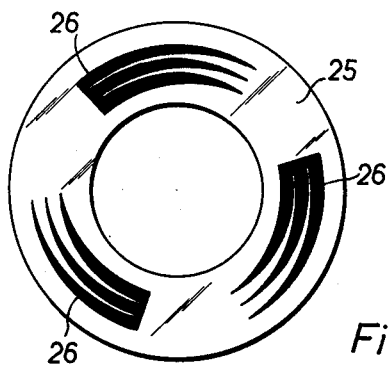
FIGS. 3 and 4 are front elevational views of the respective light controlling screens shown in FIG. 2.

Referring to FIG. 3, it will be noted that screen 25 has located thereon three similar, and preferably identical, light-impermeable zones 26, respectively coordinated with the three partial cells 10. In the particular embodiment shown, each light-impermeable zone 26 comprises three radially adjacent arcuate wedges concentric with the axis of the objective. By rotational adjustment of ring 24, either completely transparent portions of ring 25 or partially light-impermeable portions thereof can be disposed in front of the cells 10, the partially light-impermeable portions comprising the zones 26. Thereby, the intensity of the light incident on the cells is modified.

Figure 4:
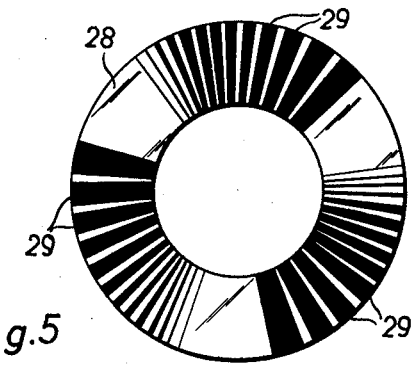

Referring again to FIG. 2, an additional setting ring 27 is rotatably mounted in the mount body 9, and carries an annular transparent material screen 28 which is fixed in setting ring 27. Referring to FIG. 4, screen 28 is also provided with three light controlling zones 29 spaced at equal angular distances from each other. In this case, the light-impermeable zones 29 are formed by truncated sectors extending radially of the ring 28. By rotational adjustment of ring 28, the light impinging through windows 16 and disk 25 onto the partial cells 10, may be either substantially not obstructed at all or controllably partially obstructed by the zones 29. It will be further noted that each of these zones is arranged to cooperate with a particular light sensitive cell 10.

Figure 5:
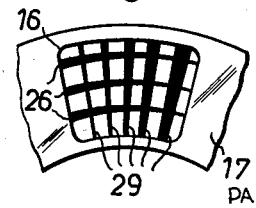
FIG. 5 is a front elevational view of the window of a light sensitive cell through which the light controlling screens can be observed.

Referring to FIG. 5, there is therein illustrated the appearance of one of the windows 16 with the light-impermeable zones 26 and 29 of the respective screens 25 and 28 in an intermediate adjustment position. It will be noted that the light-permeable portions and light-impermeable zones are uniformly distributed over the entire area of the window 16 so that the light impinging on the cell sections 10 is likewise uniformly distributed over the entire light sensitive surfaces of these cell sections.

Referring again to FIG. 2, setting ring 27 is connected for rotation with an exposure time setting ring 31 by means of a flap 30 entering an opening or slot in the ring 31. This ring carries a scale 32 cooperable with a fixed indicating mark 33. Also cooperable with the fixed indicating mark 33 is the scale 34 of a distance adjusting ring 35 connected, in a known manner, with the adjustable part 36 of the objective mount, the front lens of the objective being indicated at 37.

The light incident on cells 10 is controlled by the screens 25 and 28 in accordance with the adjusted values of film sensitivity and exposure time in such a manner that the position of the indicator of the measuring instrument 5 provides a reference for adjustment of the diaphragm opening. Thus, this indicator 6 can cooperate with a scale of diaphragm opening values and accordingly indicate the diaphragm opening value to be selected in each case. However, a conventional follow-up indicator coupled with the diaphragm adjusting ring, or a scanning device, can be coordinated with the pointer 6 so that the follow-up indicator can be adjusted to the position of indicator 6 or, by proper scanning of the position of indicator 6, the diaphragm opening can be correctly adjusted in accordance with the prevailing light conditions. It will be understood that it is also possible to couple the setting ring 27 with the diaphragm opening adjusting ring, so that the indication provided by indicator 6 of the measuring instrument 5 can be used as a reference for the adjustment of the exposure time value.

The screens 25 and 28 could be made of non-transparent material provided with openings having the shape of the zones 26 and 29, whereupon these zones would be light-permeable zones rather than light-impermeable zones. While the zones 26 illustrated in FIG. 3 are formed by uniformly tapered arcuate wedges, it is within the scope of the invention to vary the areas of the zones 26 in step by step arrangement, and the same may be done with respect to the zones 29 of screen 28. Also, it is not essential that zones 26 and 29 be formed of light-permeable and completely light-impermeable portions, as they may also comprise fields which, as to one portion, are light-permeable, and as to other portions are partially light-permeable.

While a specific embodiment of the invention has been shown and described in detail to illustrate the application of the principles of the invention, it will be understood that the invention may be embodied otherwise without departing from such principles.

What is claimed is:

1. In a photographic camera: an objective; an electric exposure meter including a fixedly positioned light-sensitive cell exposed to incident light; a first exposure condition setting means adjustable for a variable exposure condition; a second exposure condition setting means adjustable for a fixed and predetermined exposure condition; and a pair of coaxial independently rotatable light screens arranged in tandem in front of said cell in the path of light incident thereupon so that the light reaching said cell must pass through both of said light screens; the light reducing zone of one screen including radially adjacent arcuate wedge shape areas substantially concentric with the screen axis; the light reducing zone of the other screen including circumferentially adjacent truncated sector areas of progressively increasing angular extent; each of said screens being coupled to a different one of said setting means, whereby the light incident upon said cell is determined conjointly by the adjustments of said setting means.

2. A photographic camera as claimed in claim 1 in which said light sensitive cell is divided into plural sections arranged at uniform angular spacings in a circular zone concentric with the axis of said screens; each screen having plural light reducing zones equal in number to the number of sections of said light sensitive cell and arranged at uniform angular spacings around the screen.

3. A photographic camera as claimed in claim 2, including a retaining member coaxially embracing the objective of the camera; said light sensitive cell being divided into three sections positioned within said retaining members in a plane perpendicular to the objective axis and arranged in a circular zone in the plane coaxial with the camera objective, the three sections being angularly spaced from each other by 120 degrees; said light screens being mounted in said retaining member one behind the other and in the path of light rays directed toward said cell sections; said second exposure condition setting means being adjustable with respect to a scale of film sensitivity values; and said first exposure condition setting means being adjustable in accordance with the desired exposure time.

References Cited in the file of this patent
UNITED STATES PATENTS

| | | |
|---|---|---|
| 2,279,723 | Tonnies | Apr. 14, 1942 |
| 2,285,761 | Tonnies | June 9, 1942 |
| 2,484,735 | Rath | Oct. 11, 1949 |
| 2,521,093 | Rath | Sept. 5, 1950 |